United States Patent
Eisendrath (10) Patent No.: US 10,863,863 B2
(45) Date of Patent: Dec. 15, 2020

(54) GRILL HEIGHT ADJUSTMENT AND INDICATOR MECHANISM AND METHODS OF USE THEREOF

(71) Applicant: GRILLWORKS LLC, Washington, DC (US)

(72) Inventor: Benjamin Eisendrath, Washington, DC (US)

(73) Assignee: GRILLWORKS LLC, Washington, DC (US)

(*) Notice: Subject to any disclaimer, the term of this patent is extended or adjusted under 35 U.S.C. 154(b) by 129 days.

(21) Appl. No.: 16/024,233

(22) Filed: Jun. 29, 2018

(65) Prior Publication Data

US 2019/0000270 A1   Jan. 3, 2019

Related U.S. Application Data

(60) Provisional application No. 62/527,302, filed on Jun. 30, 2017.

(51) Int. Cl.
*A47J 37/07* (2006.01)

(52) U.S. Cl.
CPC ....... *A47J 37/0786* (2013.01); *A47J 37/0704* (2013.01); *A47J 2037/0795* (2013.01)

(58) Field of Classification Search
CPC ............... A47J 37/0786; A47J 37/0704; A47J 2037/0795; A47B 17/02; A47B 2200/0042; A47B 2200/0041; A47B 9/00; A47B 57/06; F16M 11/046; F16M 11/26; F16M 11/24; F16M 11/28; Y10T 74/19879; Y10T 74/1441; Y10T 74/18528

USPC .................................................... 126/25 A
See application file for complete search history.

(56) References Cited

U.S. PATENT DOCUMENTS

| | | | | |
|---|---|---|---|---|
| 1,413,632 A * | 4/1922 | Tanner | ............ | G07B 11/09 235/32 |
| 1,588,573 A * | 6/1926 | Edmiston | ............ | A61G 7/1015 5/84.1 |
| 1,653,389 A * | 12/1927 | Cartelli | ............ | G08G 1/09 340/932.1 |
| 2,213,483 A * | 9/1940 | Benson | ............ | A47J 37/0704 126/9 R |
| 2,386,815 A * | 10/1945 | Roberts | ............ | A47J 37/06 126/25 A |

(Continued)

FOREIGN PATENT DOCUMENTS

EP         0379262 A1 *  7/1990   ............ A47B 17/02

*Primary Examiner* — Jorge A Pereiro
(74) *Attorney, Agent, or Firm* — Arent Fox LLP (57) ABSTRACT

A grill height adjustment and height indication apparatus for indicating the height setting of a grill, the grill height indication apparatus including a height indicator driving portion operatively connected to a grill height adjustment crank. The apparatus further includes an indication portion, having a plurality of incremental markings, for indicating a grill height. The indicator driving portion drives the indication portion to display a first incremental marking for a first grill height and the height indicator driving portion drives the indication portion to display a second incremental marking for at least a second grill height different from the first grill height. The indication apparatus may further include an audible indication portion that produces an audible tone at set increments as the grill height adjustment crank is rotated.

18 Claims, 9 Drawing Sheets

(56) References Cited

U.S. PATENT DOCUMENTS

| | | | | |
|---|---|---|---|---|
| 2,463,594 A | * | 3/1949 | Brigham | G06M 1/163 235/103 |
| 2,605,647 A | * | 8/1952 | Duvoisin | F16H 27/06 74/436 |
| 2,608,149 A | * | 8/1952 | Ellis | F24B 1/182 99/421 HV |
| 2,726,499 A | * | 12/1955 | Fischer | A01K 97/01 53/371.9 |
| 2,734,338 A | * | 2/1956 | Uhlig et al. | G04B 19/21 368/78 |
| 2,794,532 A | * | 6/1957 | Snow | B65H 54/14 198/464.1 |
| 2,846,833 A | * | 8/1958 | Snow | B65H 54/14 53/534 |
| 2,878,333 A | * | 3/1959 | McCarty | H01H 9/0027 200/402 |
| 2,891,824 A | * | 6/1959 | Fulton | B66D 1/06 384/440 |
| 2,903,914 A | * | 9/1959 | Tarzian | B23P 21/006 29/33 R |
| 2,934,970 A | * | 5/1960 | Parstorfer | H01H 21/50 74/436 |
| 3,045,732 A | * | 7/1962 | Vadas | A23N 4/04 99/489 |
| 3,056,549 A | * | 10/1962 | De Young | G06M 3/10 235/117 R |
| 3,101,080 A | * | 8/1963 | Lorbacher | A47J 37/0704 126/25 A |
| 3,163,819 A | * | 12/1964 | Calhoun | G01D 7/12 324/99 R |
| 3,222,948 A | * | 12/1965 | Demart | B60S 9/08 74/89.28 |
| 3,279,281 A | * | 10/1966 | Anderson | F16H 27/06 74/820 |
| 3,385,238 A | * | 5/1968 | Jay | A47B 9/00 108/147 |
| 3,445,158 A | * | 5/1969 | Davidson | G03B 15/00 352/68 |
| 3,704,527 A | * | 12/1972 | Berkman | G09B 25/02 434/401 |
| 3,738,257 A | * | 6/1973 | Manfre | A23N 4/12 99/547 |
| 3,764,891 A | * | 10/1973 | Lingenfelter | H01H 9/0027 323/341 |
| 3,842,683 A | * | 10/1974 | Valdettaro | H03J 1/045 74/10.41 |
| 4,282,778 A | * | 8/1981 | Yang | B23Q 16/025 74/820 |
| 4,462,306 A | * | 7/1984 | Eisendrath | A47J 37/067 126/25 A |
| 4,541,406 A | * | 9/1985 | DaSambiagio | A47J 37/0763 126/25 A |
| 4,604,955 A | * | 8/1986 | Fleischer | A47B 9/04 108/106 |
| 4,615,279 A | * | 10/1986 | de la Haye | A47B 9/04 108/147 |
| 4,658,710 A | * | 4/1987 | Quet | A47J 37/0704 126/25 A |
| 4,926,838 A | * | 5/1990 | Sells | A47J 37/041 126/147 |
| 5,363,752 A | * | 11/1994 | Weil | A47J 37/067 99/400 |
| 5,458,053 A | * | 10/1995 | Hsiao | A47J 37/0704 126/25 A |
| 5,575,605 A | * | 11/1996 | Fisher | B62B 1/14 280/47.29 |
| 5,660,101 A | * | 8/1997 | Cirigliano | A47J 37/0704 126/25 A |
| 5,941,182 A | * | 8/1999 | Greene | A47B 9/12 108/147 |
| 5,984,353 A | * | 11/1999 | Rasmussen | B60S 9/04 188/83 |
| 6,062,148 A | * | 5/2000 | Hodge | A47B 9/02 108/147 |
| 6,116,580 A | * | 9/2000 | Hull | B66D 1/06 254/357 |
| 6,229,136 B1 | * | 5/2001 | Banks | G02B 7/021 250/216 |
| 6,662,686 B2 | * | 12/2003 | Chan | B23Q 5/34 74/665 F |
| 6,935,250 B1 | * | 8/2005 | Arnold | A47B 9/04 108/147 |
| D708,889 S | * | 7/2014 | Eisendrath | D7/332 |
| 9,277,840 B2 | * | 3/2016 | Ikeda | A47J 37/0704 |
| 2002/0083786 A1 | * | 7/2002 | Yan | F16H 27/06 74/436 |
| 2008/0178779 A1 | * | 7/2008 | Agee | A47B 9/04 108/147 |
| 2009/0151575 A1 | * | 6/2009 | Eisendrath | A47J 37/041 99/340 |
| 2011/0073821 A1 | * | 3/2011 | Nirenberg | B60D 1/66 254/420 |
| 2012/0288596 A1 | * | 11/2012 | Holdo Baggott | A47J 37/0704 426/235 |
| 2015/0047625 A1 | * | 2/2015 | Weil | A47J 37/0713 126/25 A |
| 2016/0089838 A1 | * | 3/2016 | Atwood | B29C 67/0085 425/375 |

\* cited by examiner

GRILL HEIGHT ADJUSTMENT AND INDICATOR MECHANISM AND METHODS OF USE THEREOF

PRIORITY

This application claims the benefit of priority to U.S. Provisional Application No. 62/527,302, filed on Jun. 30, 2017, the contents of which are hereby incorporated by reference in its entirety.

TECHNICAL FIELD

Aspects of the present disclosure generally relate to a grill height adjustment mechanism and indicator mechanism for use with a grill for outdoor and/or indoor use and methods of use thereof. The grill height adjustment mechanism allows for a cooking surface height adjustment, for example. Aspects of the disclosure also relate to a mechanism for providing visual and/or audible indication of a cooking surface height setting.

BACKGROUND

The prior art illustrates various outdoor grills which use charcoal and/or propane or natural gas as the source of fuel. For example, U.S. Pat. No. 4,572,062 discloses a roasting machine having a firebox that is movable in a vertical direction. Conventional grills, especially coal or wood burning grills, are oftentimes preferred for the experience of grilling over an open flame and for the flavor that burning wood and/or coal impart into any foods being cooked on the grill. However, grilling over an open fire can be inefficient due to the inability to precisely control cooking temperature.

One proposal for improving temperature control during grilling involves the use of adjustable height gilling racks. For example, U.S. Pat. No. 4,541,406 discloses a portable grill having an adjustable height grill rack. Grills with adjustable racks allow a user to control grilling temperature by controlling the distance between the cooking surface and the heat source (e.g., wood and/or coal). Because of various environmental conditions that grills may be subject to (e.g., rain or other weather exposure), adjustable height grill racks may become unreliable or difficult to adjust, especially as components wear.

There remains an unmet need in the art for suitably height adjustable grills. For example, there remains an unmet need for grills having a visual and/or audible indication for identifying and/or precisely adjusting a grill height setting (e.g., the distance from the heat source to the grill surface). Such a grill height setting indicator may be especially useful in a commercial cooking setting. For example, a cook may wish to give instructions to a user of a grill to adjust the grill rack to a certain height from the heat source. Among other advantages, such grill height adjustment mechanism with an audible and/or visual mechanism for identifying a grill height setting may enable users to more easily control a cooking temperature while grilling.

BRIEF DESCRIPTION

In accordance with aspects of the disclosure, a grill is described having grill rack adjustment mechanism that includes a grill height indication apparatus for indicating the height setting of a grill rack. The grill height indication apparatus may include a height indicator driving portion operatively connected to a grill height adjustment crank. The grill height indication apparatus may further include an indication portion having a plurality of incremental markings for indicating a grill height. The height indicator driving portion may be driven to a first position in which a first incremental marking for a first grill height is displayed, and the height indicator driving portion may be driven to a second position in which a second incremental marking for a second grill height is displayed that differs from the first grill height display.

The grill height indication apparatus may further comprise an audible position indicator. The audible position indicator may include an audible member to contact a separately rotatably mounted contact wheel and/or to a portion of the abovementioned indication portion. When a rotational force is translated to the contact wheel and/or the indication portion, for example, an audible indication may be emitted at set increments as the grill rack height is adjusted.

In the abovementioned aspects, the grill height indication apparatus may be operatively connected to a grill height adjustment mechanism. The grill height adjustment mechanism may translate the rotational movement of the adjustment crank, for example, to a vertical movement of the adjustable grill rack. In one example variation, the grill height adjustment mechanism may include a gearbox having an input shaft operatively connected to the grill height adjustment crank. The gearbox may output the rotational force to a rotatable conveyance shaft having a threaded portion. The adjustable grill rack may be connected to a conveyance traveling member having threads operably engageable with the threaded portion of the conveyance shaft, such that a rotational force of the conveyance shaft may be converted to a vertical directional movement of the adjustable grill rack.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Figure 1A:
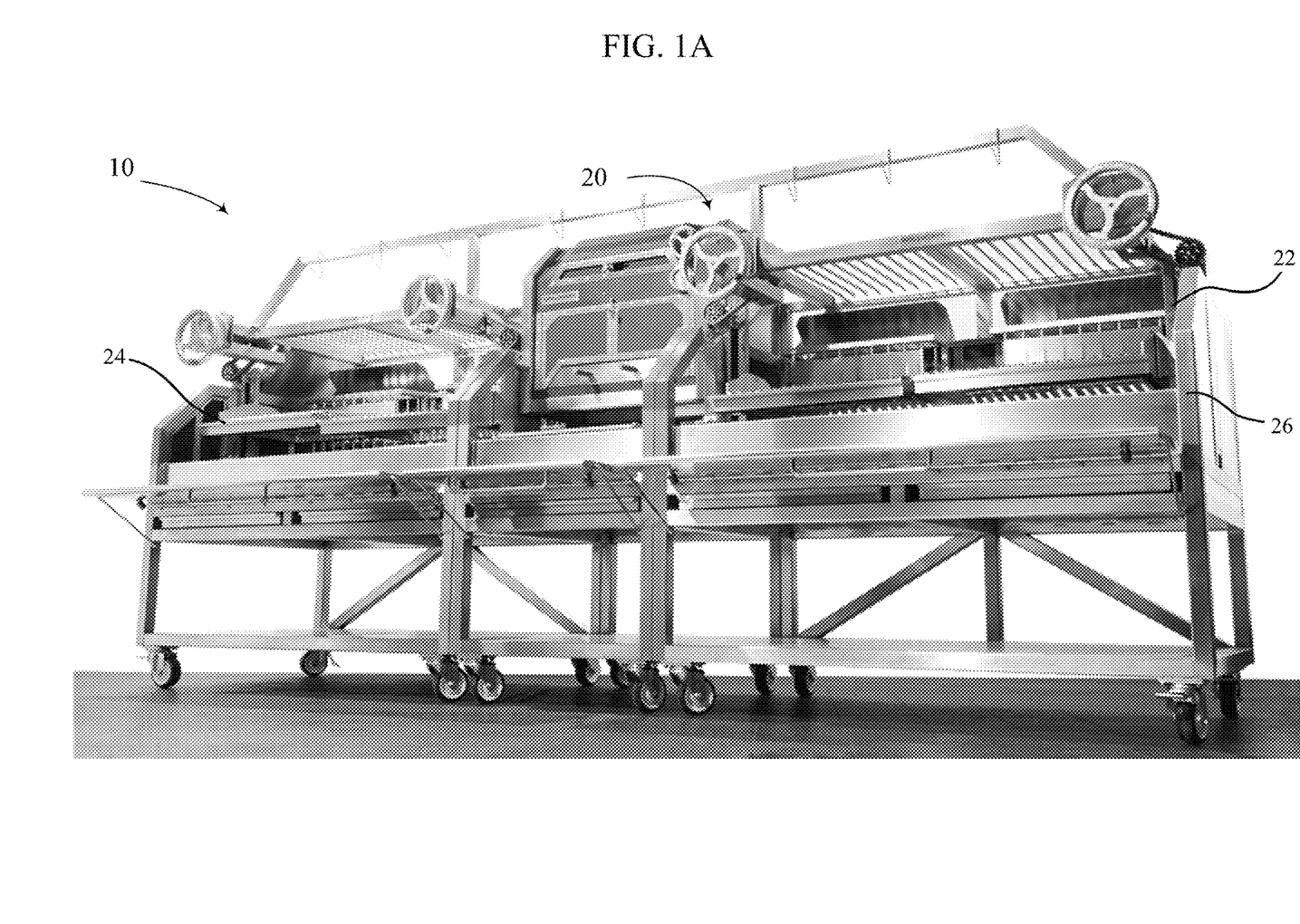
FIG. 1A shows an example grill in accordance with aspects of the present disclosure.
Figure 1B:
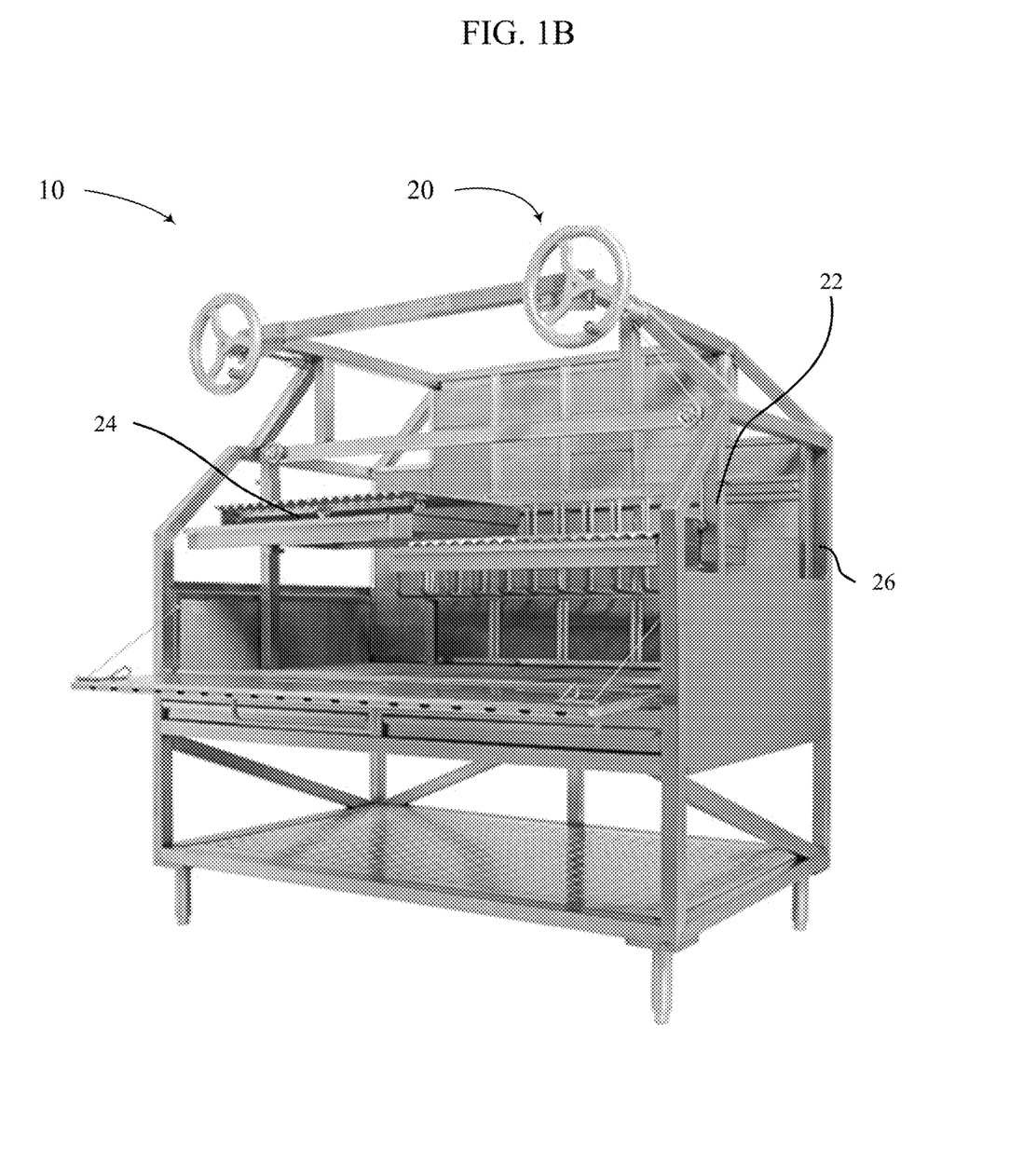
FIG. 1B shows an example grill in accordance with aspects of the present disclosure.

The present disclosure relates to a grill and a grill rack adjustor having one or more grill height indicators for indicating the height setting of a grill. As shown in FIGS. 1A and 1B, an example grill 10 in accordance with aspects of the present disclosure may include a grill frame 26. The grill frame 26 may have an adjustable height grill rack 24, which may be mounted to a grill height adjustment frame 22; the grill rack 24 may also be operatively connected to the grill height adjustment frame 22. The grill height adjustment frame 22 may include a grill height adjustment mechanism (e.g., as further shown in FIG. 9) for controlling the vertical movement of each grill rack 24. The grill height adjustment mechanism 22 may be adjusted using a grill height adjustment crank 20. While not shown in FIG. 1B, each of the grill height adjustment cranks may be operatively connected to one or more grill height indicators, e.g., as shown in FIGS. 1A, 2, and 3.

Figure 2:
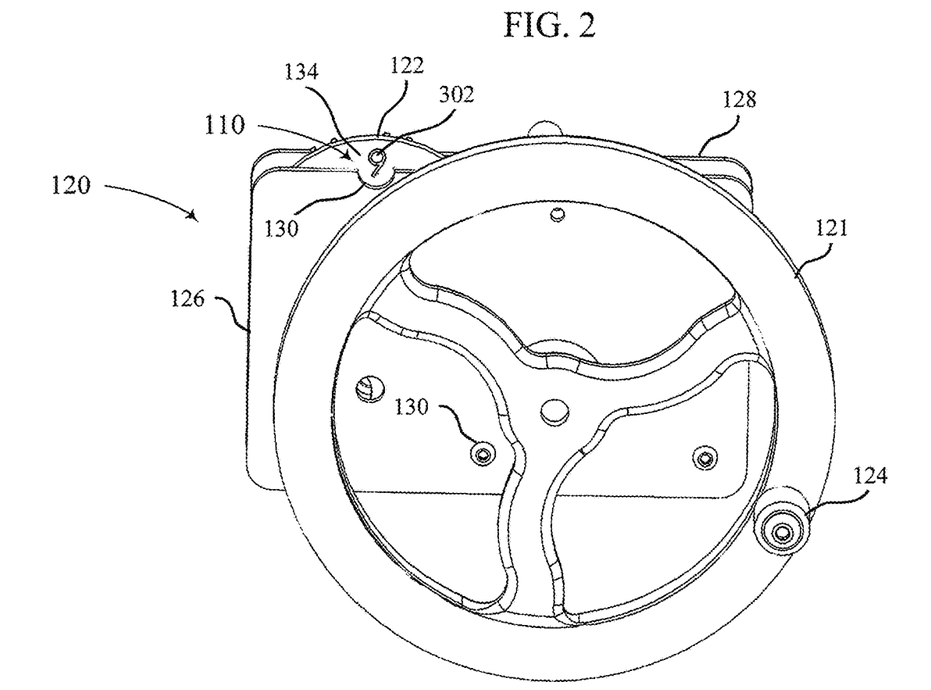
FIG. 2 is a front perspective view of an example grill height indicator according to aspects of the present disclosure.

Each of the grill height adjustment cranks 20 of FIG. 1A and FIG. 1B may be operatively connected to one or more grill height indicators 120, as further shown in FIG. 2. As shown in FIG. 2, each grill height indicator 120 may include a grill height adjustment crank 121 having a handle 124. The handle 124 may further comprise a handle fastener 124B and a bushing 124A (shown in FIG. 4) so that the handle 124 is rotatably mounted to the crank 121. Each grill height indicator 120 may further include a front plate 126 and a rear plate 128 held together with fasteners 130 for retaining the front and rear plate 126, 128 relative to one another in a spaced configuration. Fasteners 130 may include any suitable type of fastening method. For example, the fasteners 130 may thread into a nut or threads tapped into the back plate 128. Further, the fasteners may be rivets and or may be welded or otherwise adhered so as to hold the front and back plates in a spaced configuration, for example.

Each grill height indicator 120 may further include a grill height display portion 110, as shown in FIG. 2, for displaying a visual/symbolic representation associated with a grill rack height. For example, the grill height display portion 110 may include a cutout 130 in the front plate 126 for displaying a portion of an indication portion 122 having a number 302. The display portion 110 may also comprise other display features, such as an electronic digital readout.

Figure 3:
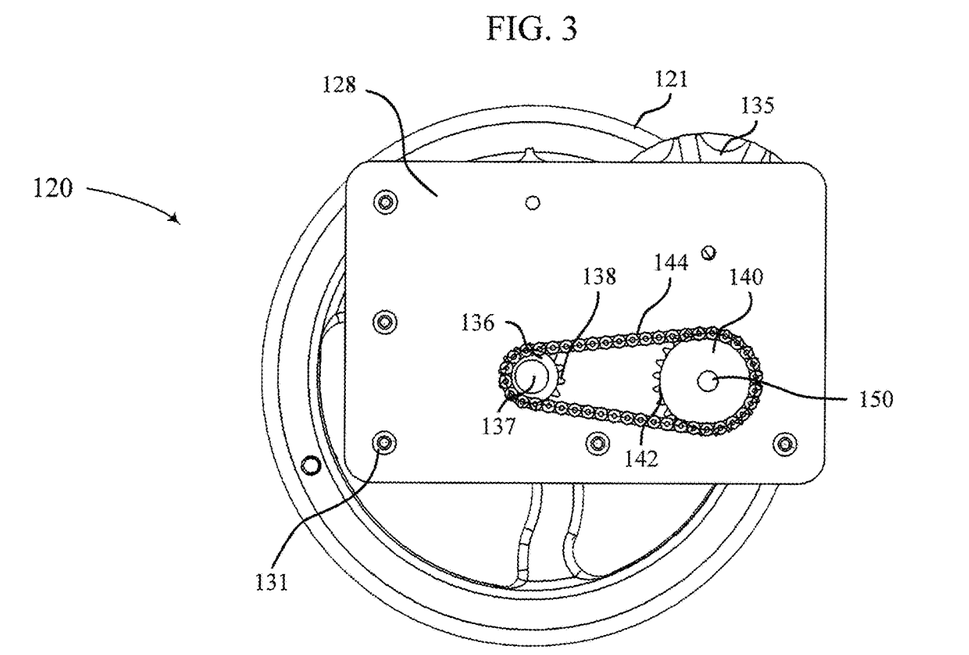
FIG. 3 is a rear view of the grill height indicator of FIG. 2, according to aspects of the present disclosure.

FIG. 3 presents a rear view of the indicator 120 shown in FIG. 2. As shown in FIG. 3, the rear plate 128 may further include an opening for a height driving shaft 137 that is operatively connected to the adjustment crank 121. The height driving shaft 137 may transmit rotation to the indication portion 122 through a crank sprocket 136, for example, having a toothed outer surface 138. The teeth 138 of the crank sprocket 136 may engage with a driving chain 144. The driving chain 144 may engage with teeth 142 on driven sprocket 140, which may in turn drive a height indicator drive shaft 150. The height indicator drive shaft 150 may be operatively coupled to the height indicator drive (as further shown and described, for example, with respect to FIGS. 5 and 6). It is noted that the abovementioned chain and sprocket configuration is only one example implementation in accordance with aspects of the present disclosure, and similar operation may be accomplished through a variety of other similarly operating devices and methods. For example, rotation from the height driving shaft 137 may be transferred to the indicator drive shaft 150 through a belt drive and/or through spur gears. Further, as another alternative to the above configurations, the indicator driving portion may be directly mounted to the height driving shaft 137; thus eliminating the need for a separate indicator driving portion shaft. Electrically powered transmission of such motion, or indication of such motion, from the height driving shaft 137 may also be provided.

As further discussed below, the height driving shaft 137 and/or indicator drive shaft 150 may further be operatively connected to a single or plurality of grill height adjustment input shafts 300 (as shown and described further, for example, in conjunction with FIG. 9) via similar methods—e.g. chain/sprocket, spur gears, belt drive, or may be directly connected to the height driving shaft 137 and/or indicator drive shaft 150.

Figure 4:
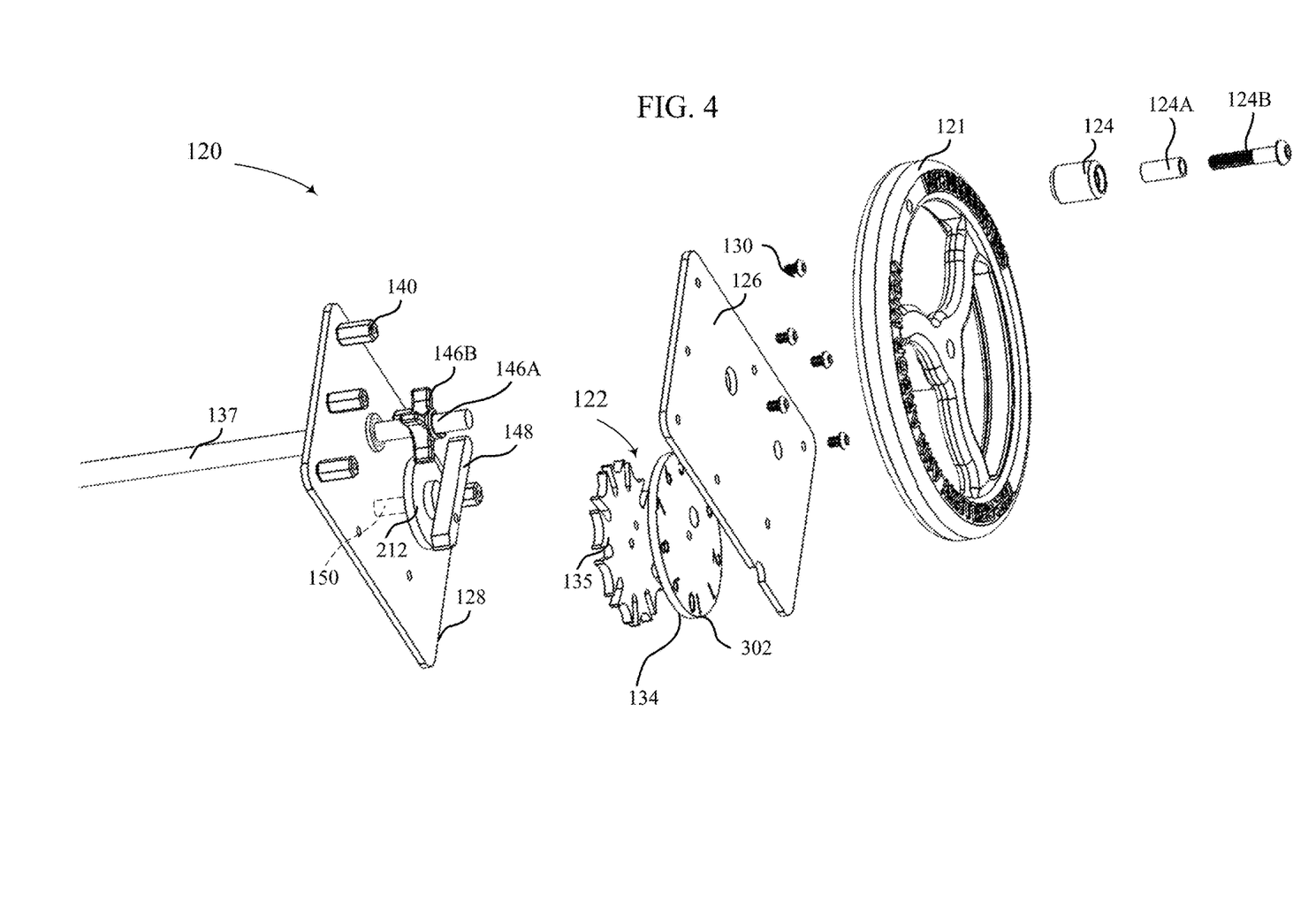
FIG. 4 is a partial exploded perspective view of the grill height indicator shown in FIGS. 1 and 2 in accordance with aspects of the disclosure.
Figure 5:
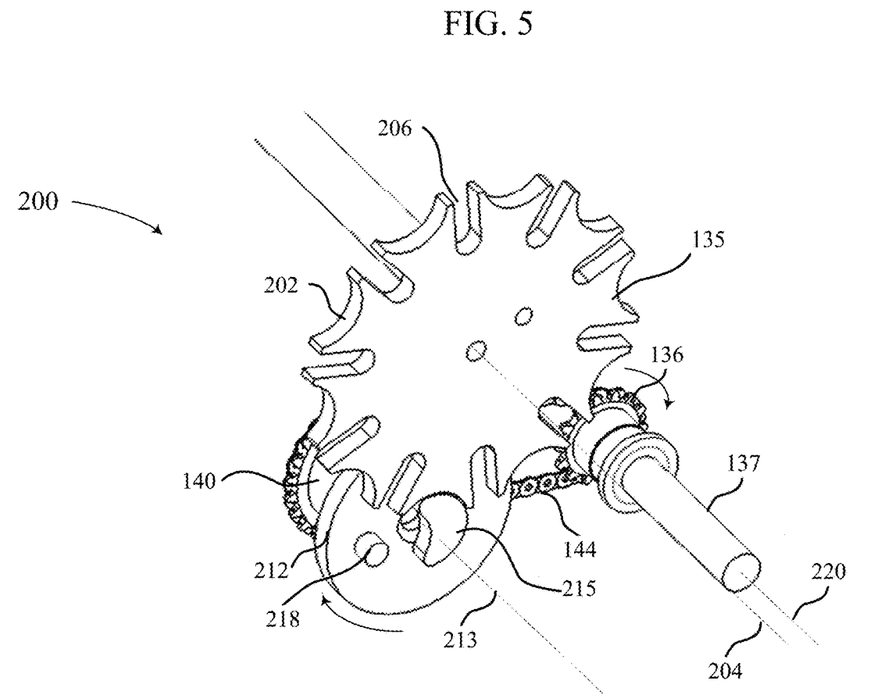
FIG. 5 is a partial perspective view of an example grill height indicator in accordance with aspects of the disclosure.
Figure 6:
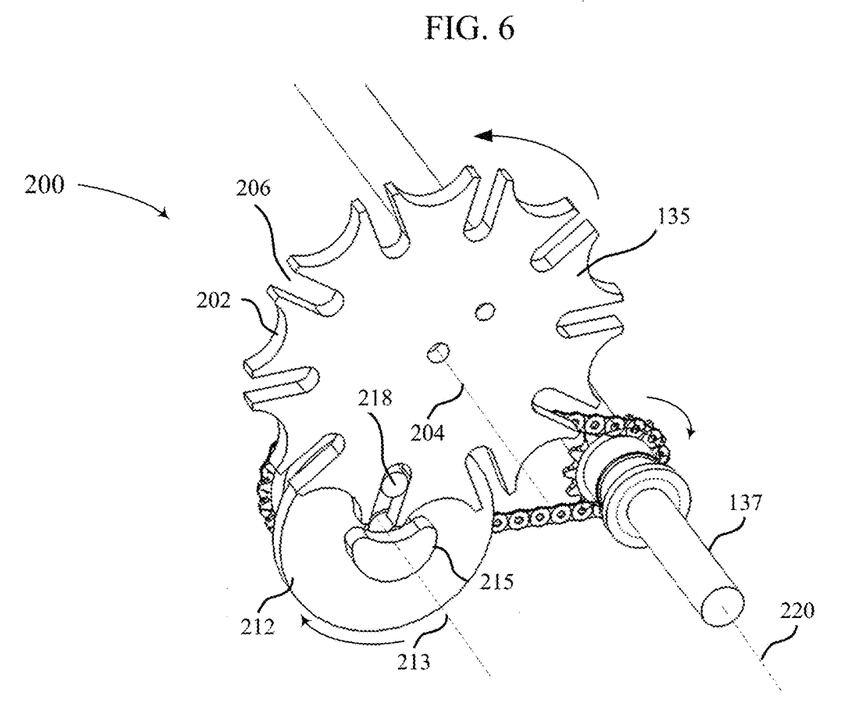
FIG. 6 is a partial perspective view of an example grill height indicator in accordance with aspects of the disclosure.

FIG. 4 presents an exploded perspective view of various aspects of the example indicator 120 of FIGS. 2 and 3. The indication apparatus 120 may include, for example, one or more spacers 140 for spacing the front plate 126 and the rear plate 128 relative to one another. The spacers 140 may be threaded to engage with fasteners 130, for example, and/or may be either welded, otherwise adhered, or machined as a portion of the back plate 128 and/or may be held to the plate with threaded fasteners and/or rivets. As shown in the exploded view of FIGS. 4-6, the indicator driving shaft 150 (FIG. 3) may be operatively coupled to an indicator driving portion 212 (FIGS. 5 and 6). The shaft 150 may comprise a separate shaft that is removable from the indicator driving portion 212, for example, or may be formed as a unitary structure with the indicator driving portion 212.

Further, the indicator 120 may optionally or alternatively include an audible indicator comprising an audible member 148, such as a lever, as shown in FIG. 4. The audible member may be configured pivotally mounted to either both or a single one of the front and back plates 126 and 128. The audible member may be positioned so as to hang in a substantially vertical orientation by the force of gravity when the grill is in the operational position. The audible member 148 may also be mounted so as to contact a contact wheel 146A, for example, having contact portions 146B. The contact wheel 146A may be mounted to the driving shaft 137. The audible member 148 may remain in a vertical position until the contact portion 146B of a contact wheel 146 periodically contacts the end of the audible member 148 causing the audible member 148 to emit a noise or sound. In another example implementation, the audible member 148 may be biased and contact wheel 146 may be arranged so that when the driving shaft 137 rotates about its longitudinal axis (e.g., as shown as ref. 220 in FIGS. 5 and 6) one or more spokes extending from the contact wheel 146A may periodically contact the audible member 148, which is slightly biased toward the contact wheel 146A, such that the audible member 148 is thereby slightly periodically displaced by, and remains in contact with, each spoke 146B (also interchangeably referred to herein as "contact portions") during rotation of the driving shaft 137. The periodic contact of the audible member 148 with the contact portions 146B of the contact wheel 146A may thereby cause an audible noise at periodic increments during the rotation of the driving shaft 137. For example, the frictional contact between the spokes and the audible member 148 may produce a noise, or an electrical connection may be completed via the contact of the audible member 148 and the contact portions 146B, the electrical connection thereby completing a circuit that produces an audible noise, such as via a speaker within the circuit. The audible member 148 may be rotatably mounted to either or both of the back plate 128 and/or front plate, for example, and may include one or more additional biasing elements, e.g. a spring, to produce biasing of the audible member 148 toward the contact wheel 146A.

Further, as another example, the audible member 148 may be rigidly mounted without a biasing element to either or both of the back plate 128 and/or front plate and the contact portions 146B may be flexible or bendable, such that contact with the audible member 148 causes deflection of the contact portion 146B while the contact portions rotatably pass the audible member 148. As another example, the audible member 148 may be flexible or bendable such that contact with the contact portions 146B causes deflection of the audible member. It is noted that the abovementioned examples are not limiting. For example, the audible member 148 may be configured to directly contact a protrusion on the indication portion 135, instead of the contact wheel 146. In the aforementioned examples, the biasing member may be configured to give a single audible notification corresponding with a symbolic indicator displayed in the display portion and/or may provide an audible notification at alternative or intermediate increments.

Figure 7:
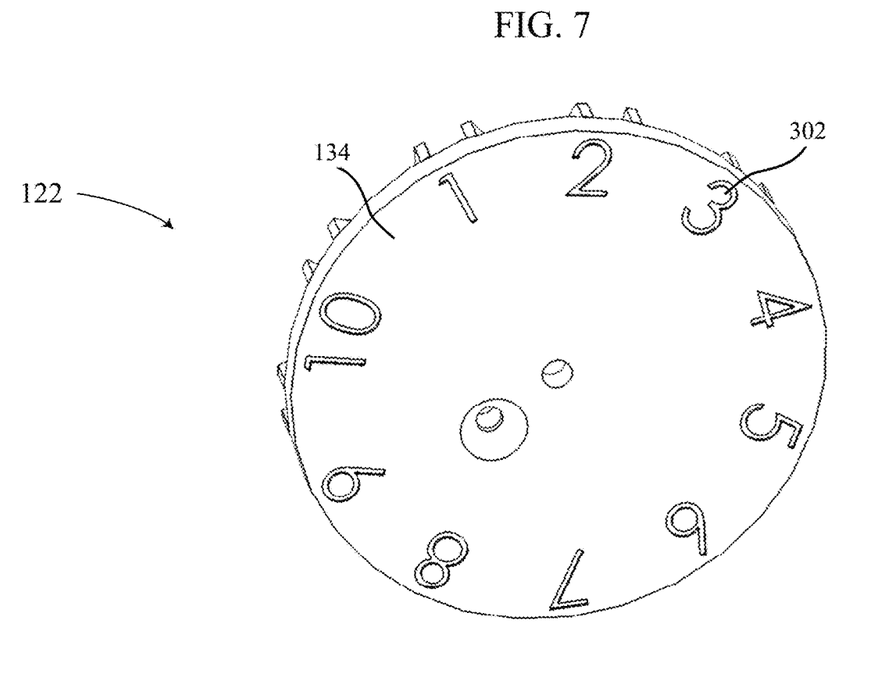
FIG. 7 is a front perspective view of an example indicator portion in accordance with aspects of the disclosure.
Figure 8:
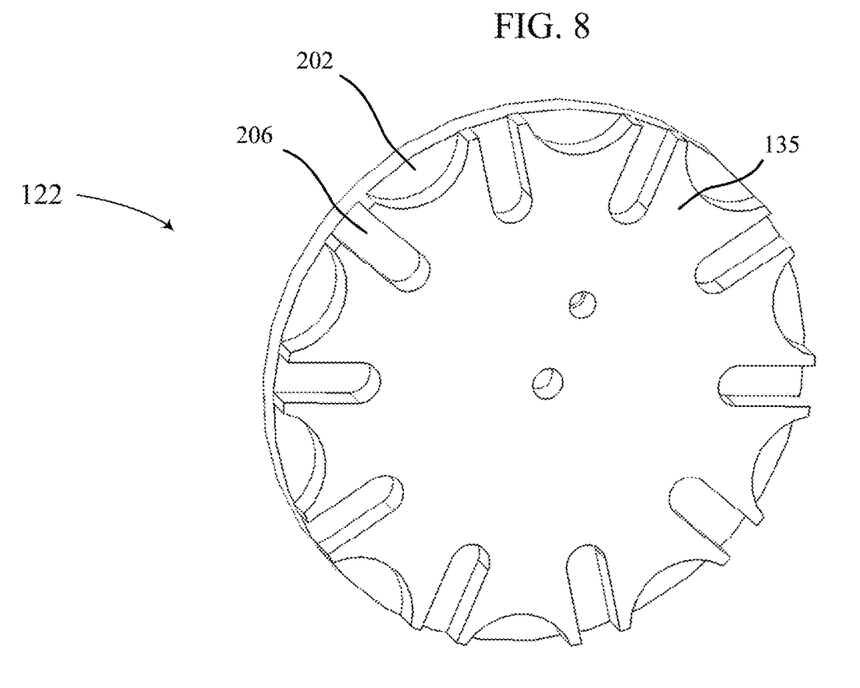
FIG. 8 is a rear perspective view of the indicator portion shown in FIG. 7, in accordance with aspects of the disclosure.

As further shown in FIG. 4, the indication portion 122 may include an indexing driven portion 135 and an indicator wheel 134. The indexing driven portion 135 and the indicator wheel 134 may be configured as two separate components, for example, which may be bonded or otherwise adhered, or otherwise be connectable to one another, or alternatively may be formed as a single component (e.g. via machining or molding). As shown in FIGS. 5 and 6, the indexing driven portion 135 may extend symmetrically from its center and be configured to rotate about its central axis 204. The indexing driven portion 135 may further include a plurality of concave portions 202 about its outer circumferential edge, separated from one another by a plurality of slots 206. As shown in FIGS. 7 and 8, each of the slots 202 in the indexing driven portion 135 may align with a symbolic representation (e.g. a number) on the circular indication portion 134.

FIGS. 5 and 6 show views of various elements 200 of the driven portion 135 and corresponding features interoperable therewith. Rotation of the indicator driven portion 135 functions to translate a continuous rotationally driven input received from the driving shaft 137 into a corresponding display by the indicator wheel 134 (see, e.g., FIGS. 2, 4, and 7) so that when a grill rack is moved from a first height setting to a second preset height setting via the crank 121, the correct symbol is correspondingly displayed at the indication portion 110 (e.g. from number 1 to number 2 in FIG. 2).

The various aspects of portion 200 shown in FIGS. 5 and 6 include a height indicator driving portion 212, having an indexing driving portion, such as pin 218 and/or guide 215, and the driving portion 212 may be rotatably mounted to the front and/or back plates (as shown in FIGS. 2-4) of the indicator apparatus 120, such as via shaft 150, so that the indicator portion and indexing driving portion 212 are rotatable about axis 213. As discussed above, the indicator driving portion 212 may have a rotational force imparted thereon via driven sprocket 140, which in turn may be rotationally driven by the crank sprocket 136 via the chain 144 (FIGS. 3, 5, and 6) The indicator driving portion 212 may further include an indexing driving portion, which may comprise, for example, a pin 218 and a guide portion, such as convex portion 215. The indexing driven portion 135 of the indication portion 122 may extend symmetrically about its central axis 204 and be configured to rotate thereabout. When the driving shaft 137 is rotated, the indexing driving portions 215, 218, for example, may interact with corresponding portions of the indexing driven portion 135 (e.g., concave portions 202 and slots 206 respectively), such that the indication portion rotates in an indexed fashion; for example, the indexed rotation may include a rotation period during which the indication portion rotates 122 and a dwell period during which the indication portion 122 remains substantially rotationally stationary, such that a visible indicator (e.g., number 302 of FIG. 2) remains unchanged within the display portion 110 of FIG. 2 during the stationary period.

FIG. 5 presents a partial perspective view of a position of the indexing driven portion 135 during a dwell period for the abovementioned indexed rotation thereof. During the dwell period, the convex portion 215 of the indexing driving portion 212 interacts with the concave portion 202 of the indexing driven portion 135 so as to retain the indexing driven portion in the same rotational position during this interaction. Since substantially no rotational force is transferred from the convex portion 215 to the concave portion 202 in the position shown in FIG. 5, the indexing driven portion 135 and the indication portion 122 (FIGS. 2, 4) remain substantially stationary during the dwell period. FIG. 6 shows a partial perspective view of the indexing driven portion 135 during a rotation period of the indexing drive portion 135. During the rotation period, the pin 218 of the indexing driving portion 212 rotationally interacts with a slot 206 of the indexing driven portion. The rotational interaction of the pin 218 with the slot 216 transfers a portion of the rotational motion of the indicator driving portion 212 to the indexing driven portion 135, thereby causing the indexing driven portion 135 and the indicator portion 122 (FIGS. 7, 8) attached thereto to rotate. Thus, during a rotation period, the indication portion 122 indexes to the next incremental marking (e.g. number 302 shown in FIG. 2). It is noted that the aspects of the present disclosure are not limited to the above configuration; for example, the indexing from a first indicator to a second indicator and so on may be achieved through the use of mutilated gears, cycloidal gears, a star wheel mechanism, and/or a cam mechanism, for example, or any other suitable features and/or method of mechanical indexing.

Figure 9:
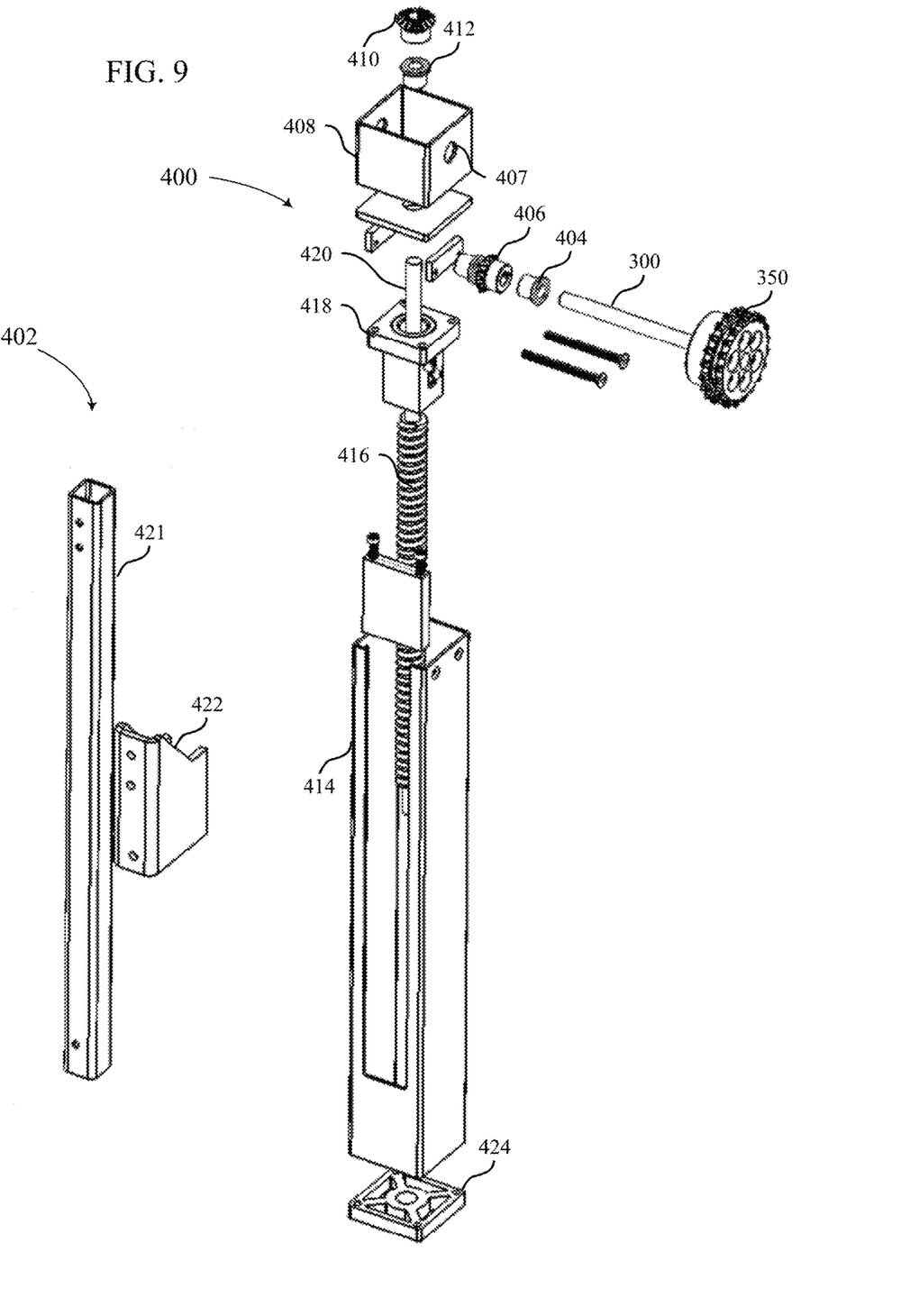
FIG. 9 is an exploded perspective view of an example grill height adjustment portion in accordance with aspects of the disclosure.
Figure 10:
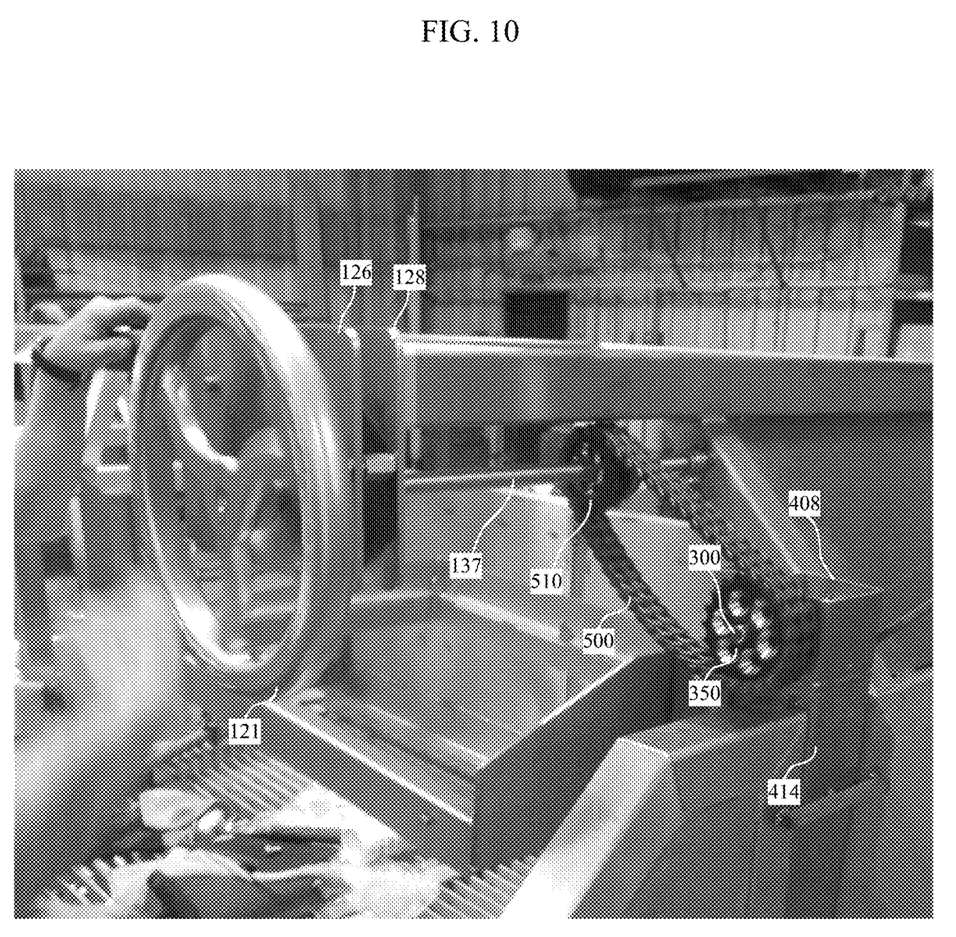
FIG. 10 is a photographic view of an example interface between the grill height indicator and grill height adjustment portion.
Figure 11:
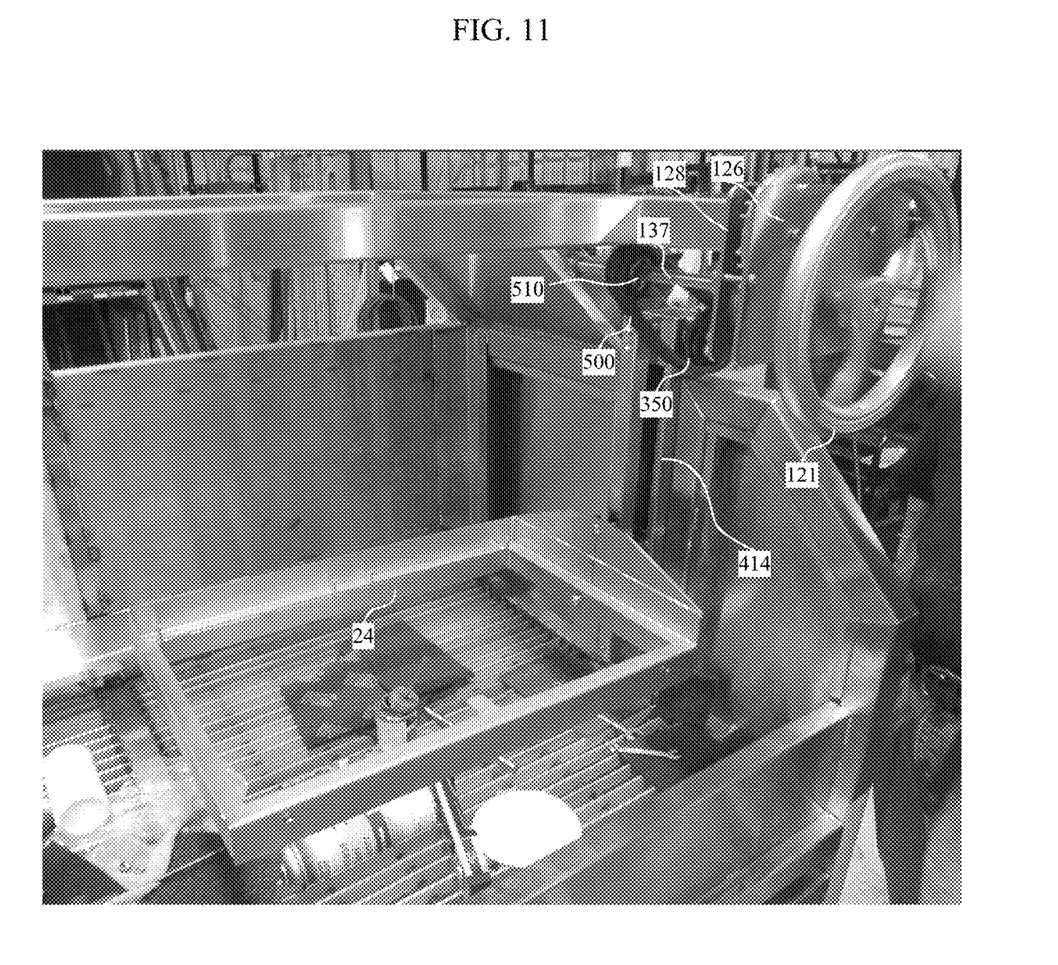
FIG. 11 is an alternative photographic view of the example interface between the grill height indicator and grill height adjustment portion shown in FIG. 10.

FIG. 9 presents an exploded perspective view of various features of an example grill height adjustment mechanism in accordance with aspects of the disclosure. Such features of the grill height adjustment mechanism may include an input shaft 300, which may receive a rotational input via crank 121, and driving shaft 137 (FIGS. 2-4). The input shaft may receive a driving input from driving shaft 137 through an input shaft driven sprocket 350, for example, which may in turn be operatively coupled via a driving chain 500 (FIGS. 10 and 11) to the driving shaft 137 through a sprocket 510 mounted to the driving shaft 137. As an alternative, the input shaft 300 may also be directly connected to the driving shaft 137, or may be connected through any other suitable mechanical features, such as a belt drive and/or a series of spur gears.

The input shaft 300 may be rotatably operable within a gearbox housing 408 through an opening 407. The input shaft 300 may rotate inside the opening 407 via a bushing and/or bearing 404, for example. The input shaft 300 may be operatively coupled to a conveyance unit driving output portion 406. The conveyance unit output portion 406 may comprise a bevel gear mounted to the input shaft 300. A conveyance driving output from portion 406 may in turn drive a conveyance driving input portion (e.g., bevel gear 410), which may be operatively coupled to a conveyance unit shaft 420, in turn having a threaded outer portion 416 extending about a portion thereof. The conveyance unit shaft 420 may be rotatably mounted within a housing 414 on bushings and/or bearings 412 and 424, for example. The conveyance driving input portion 410 may be a toothed bevel gear configured to mesh with the conveyance output portion 406.

A grill rack frame 402 (e.g. which may, for example make up all or a part of grill height adjustment frame 22 shown in FIGS. 1A and 1B) may be mounted to the grill rack (FIGS. 1A and 1B). The grill rack frame 402 may comprise a first frame component 421, which may, for example, extend vertically when the grill 10 (FIGS. 1A and 1B) is in an operating position, and a conveyance unit mounting component 422. The conveyance unit mounting component 422 may in turn be operatively coupled to a conveyance unit traveling member 418, which may alternatively be referred to as a worm gear engagement portion. The conveyance unit traveling member 418 may be configured to receive a rotational input from the threaded portion 416 of the conveyance unit shaft 420 so as to travel along the axial direction of the unit shaft 510. The conveyance unit traveling member 418 may comprise a ball screw assembly having one or more internal ball bearings, for example, which are configured to engage with the threads of the threaded portion 416. Another example of a ball screw assembly is disclosed by U.S. Pat. No. 3,258,983, the entire contents of which are hereby incorporated by reference herein. It is noted that the disclosure is not limited to the use of a ball screw assembly. For example, the conveyance unit traveling member 418 may also comprise a threaded portions or plurality of portions having threads therein for corresponding operative interaction with threaded portion 416.

In operation, when a rotational motion is applied to the input shaft 300, the rotational motion is transferred to the conveyance unit shaft 420 via the driving output portion 406 and the driving input portion 410 interacting therewith; the conveyance unit traveling member 418 thereby travels along the input shaft 300. As such, the grill rack which is operatively connected to the conveyance traveling unit moves up or down in a vertical direction, when in the positions shown in FIGS. 1A and 1B, depending on the direction in which a rotational force is applied to the input shaft 300.

It is noted that while the example configuration disclosed above includes a threaded conveyance member and a conveyance unit traveling member, the abovementioned grill height indication apparatus may be used with alternative height adjustment mechanisms. For example a cable an pulley system and/or a rack and pinion mechanism may be employed to adjust a grill rack height.

This written description uses examples to disclose aspects hereof, including preferred embodiments, and also to enable any person skilled in the art to practice thereby, including making and using any devices or systems and performing any incorporated methods. The patentable scope hereof is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A grill height indication apparatus for indicating a variable height setting of a grill having a grill height adjustment crank, the grill height indication apparatus comprising:
    a height indicator driving portion operatively connected to the grill height adjustment crank;
    an indication portion for variably indicating a grill height, wherein the indication portion has a plurality of incremental height indications, wherein the height indicator driving portion drives the indication portion so as to variably display a first incremental marking for a first grill height and to display a second incremental marking for a second grill height; and
    an audible indication portion operatively connected to the grill height adjustment crank, wherein the audible indication portion produces an audible tone at increments that correspond with set increments as the grill height adjustment crank is rotated.

2. The grill height indication apparatus of claim 1, wherein the height indicator driving portion progresses the indication portion from displaying the first incremental marking to displaying the second incremental marking in response to the grill height adjustment crank being rotated at least one full rotation.

3. The grill height indication apparatus of claim 2, wherein the height indicator driving portion further comprises an indexing driving portion and the indication portion further comprises an indexing driven portion, wherein the indexing driving portion drives the indexing driven portion so that as the grill height adjustment crank is rotated, the indication portion indexes from the first incremental marking to the second incremental marking.

4. The grill height indication apparatus of claim 1, wherein the indication portion rotates around a first axis and the height indicator driving portion rotates around a second axis.

5. The grill height indication apparatus of claim 4, wherein the height indicator driving portion further comprises an indexing portion comprising:
    an indexing driving portion; and
    an indexing driven portion, wherein as the height indicator driving portion rotates, the interaction of the indexing driving portion with the indexing driven portion of the indication portion causes the indication portion to perform an indexed rotation, the indexed rotation comprising:
a rotation period; and
a dwell period.

6. The grill height indication apparatus of claim 5, wherein the indexing driven portion of the indication portion further comprises:
a plurality of slots extending from an outer surface of the indexing driven portion towards the first axis; and
a rounded concave portion extending between two of the plurality of slots, wherein the indexing driving portion of the indicator driving portion further comprises:
a pin; and
a convex portion, wherein the pin engages with one of the plurality of slots during the rotation period and the convex portion engages with the concave portion during the dwell period.

7. The grill height indication apparatus of claim 1, wherein the grill height adjustment crank is operatively connected to a gearbox, wherein the gearbox translates the rotation of the adjustment crank to a substantially vertical movement of a grill rack.

8. The grill height indication apparatus of claim 7, wherein the gearbox translates the rotation of the adjustment crank to a substantially vertical movement of an adjustable grill rack via a worm gear operatively connected to the grill rack, wherein the worm gear engages with a worm gear engagement portion connected to the adjustable grill rack.

9. A grill height indication apparatus of claim 8, wherein the worm gear engagement portion further comprises a ball screw assembly.

10. The grill height indication apparatus of claim 1, wherein the audible indication portion comprises a contact portion that rotates in response to rotation of the height adjustment crank.

11. The grill height indication apparatus of claim 10, wherein in the audible indication portion further comprises an audible member, wherein the contact portion selectively contacts the audible member to produce the audible tone.

12. The grill height indication apparatus of claim 10, wherein the audible indication portion includes a circuit, and wherein the contact portions complete the circuit so as to produce the audible tone.

13. The grill height indication apparatus of claim 12, wherein the circuit produces the audible tone via a speaker.

14. A grill height adjustment and indication apparatus comprising:
a rotatable grill height adjustment crank connected to a driving shaft;
a gearbox connected to the driving shaft, wherein the gearbox translates the rotation of the adjustment crank to a substantially vertical movement of an adjustable grill rack via a worm gear operatively connected to the grill rack;
a rotatable indexing driving member operatively connected to the driving shaft, wherein the indexing driving member has a convex portion and a pin;
a rotatable indexing driven portion, wherein the indexing driven portion has a concave portion and a slot, wherein the rotation of the indexing driving member causes the pin to interact with the slot during a rotation period of the indexing driven portion and the concave portion to interact with the convex portion during a dwell period of the indexing driven portion;
a rotatable indication portion having a plurality of height indicators, wherein one of the plurality of indicators is substantially stationarily displayed during a dwell period of the rotatable indexing driven portion and the rotatable indication portion rotates to another of the plurality of height indications during a rotation period of the rotatable indexing driven portion; and
an audible indication portion operatively connected to the grill height adjustment crank, wherein the audible indication portion produces an audible tone at increments that correspond with a rotation of the rotatable indexing driven portion.

15. The grill height indication apparatus of claim 14, wherein the audible indication portion comprises a contact portion that rotates in response to rotation of the height adjustment crank.

16. The grill height indication apparatus of claim 15, wherein in the audible indication portion further comprises an audible member, wherein the contact portion selectively contacts the audible member to produce the audible tone.

17. The grill height indication apparatus of claim 15, wherein the audible indication portion includes a circuit, and wherein the contact portions complete a circuit so as to produce the audible tone.

18. The grill height indication apparatus of claim 17, wherein the circuit produces the audible tone via a speaker.

* * * * *